(12) United States Patent
Vaidyanathan

(10) Patent No.: US 7,010,030 B2
(45) Date of Patent: Mar. 7, 2006

(54) SOFTWARE DEFINABLE BLOCK ADAPTIVE DECISION FEEDBACK EQUALIZER

(75) Inventor: Krishnamurthy Vaidyanathan, Ossining City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 813 days.

(21) Appl. No.: 09/910,971

(22) Filed: Jul. 20, 2001

(65) Prior Publication Data

US 2003/0031244 A1    Feb. 13, 2003

(51) Int. Cl.
*H03H 7/30*    (2006.01)

(52) U.S. Cl. .................. 375/233; 375/232; 375/341; 714/792; 708/319

(58) Field of Classification Search ............. 375/232, 375/233, 341; 708/319; 714/792
See application file for complete search history.

(56) References Cited

U.S. PATENT DOCUMENTS

| | | | | |
|---|---|---|---|---|
| 5,157,690 A * | 10/1992 | Buttle | .......................... | 375/232 |
| 5,436,929 A * | 7/1995 | Kawas Kaleh | ............... | 375/233 |
| 5,790,598 A * | 8/1998 | Moreland et al. | ........... | 375/233 |
| 6,052,702 A * | 4/2000 | Berberidis et al. | ........... | 708/319 |
| 6,219,379 B1 * | 4/2001 | Ghosh | ......................... | 375/232 |
| 6,668,014 B1 * | 12/2003 | Endres et al. | ................ | 375/232 |
| 6,707,850 B1 * | 3/2004 | Blake et al. | ................. | 375/233 |
| 6,754,264 B1 * | 6/2004 | Ben Rached et al. | ........ | 375/232 |
| 6,775,322 B1 * | 8/2004 | Zangi et al. | ................. | 375/232 |
| 6,775,334 B1 * | 8/2004 | Liu et al. | ..................... | 375/341 |
| 6,823,489 B1 * | 11/2004 | Wittig et al. | ................. | 714/792 |
| 6,829,297 B1 * | 12/2004 | Xia et al. | ..................... | 375/232 |
| 2002/0172275 A1 * | 11/2002 | Birru | ........................... | 375/233 |

OTHER PUBLICATIONS

Williamson, D. et al.; Block Decision Feedback Equalization; IEEE Transcations on Communications; vol. 40, No. 2; Feb. 1992; pp. 255-264.*

"Block Channel Equalization in the Presence of a Cochannel Interferent Signal", by A. Ginesi et al, XP000880702.

"An Adaptive Block Decision Feedback Receiver for improved Performance in Channels with Severe Intersymbol Interference", by David E. Lambert et al.

* cited by examiner

*Primary Examiner*—Stephen Chin
*Assistant Examiner*—Sudhanshu C. Pathak

(57) ABSTRACT

A block decision feedback equalizer is designed by deriving, from first principles, a block exact decision feedback equalizer and then systematically applying simplifying assumptions to obtain several block approximate decision feedback equalizers, each suitable for multipath channel equalization and having error convergence insensitive to filter length. The resulting block decision feedback equalizer is software definable may be dynamically adapted by choosing whether to update error correction coefficients.

20 Claims, 8 Drawing Sheets

SOFTWARE DEFINABLE BLOCK ADAPTIVE DECISION FEEDBACK EQUALIZER

TECHNICAL FIELD OF THE INVENTION

The present invention is directed, in general, to signal processing for wireless receivers and, more specifically, to decision feedback equalizers employed for channel equalization within wireless receivers.

BACKGROUND OF THE INVENTION

In any receiver system, the channel equalizer is an essential component, improving the bit error rate (BER) by correcting the received signal for the effects of the channel. Channel equalization is typically best performed using a decision feedback equalizer (DFE), especially if the channel has deep fades. Decision feedback equalizers consist of a forward adaptive transversal filter and a feedback adaptive transversal filter, with the equalized signal being the sum of the outputs of the two filters. The base-band received signal corrupted by multi-path interference is fed into the forward filter while decisions made on the equalized signal are fed back through the feedback filter.

As with virtually all channel equalizers, decision feedback equalizers are characterized by high computational complexity dependent on date rate, spectral efficiency, and rate of change for multi-path channels. Moreover, better decision feedback equalizer implementations employ large transversal filter lengths. Accordingly, decision feedback equalizers within high throughput systems such as digital television are typically designed as fixed-function application specific integrated circuit (ASIC) cores processing data on a sample-by-sample basis.

Fixed function ASIC implementation necessitates expensive redesign when an applicable standard evolves due to either new service requirements or the need for performance enhancement. Moreover, some applications such as software radio (SWR) require significant flexibility to adapt to different modulation formats and receiver signal processing algorithms. Combined with high throughput requirements and computationally expensive algorithms, such need for reconfigurability precludes economically viable hardware implementation of software radio.

There is, therefore, a need in the art for an improved decision feedback equalizer for use in channel equalization lowering computational complexity for the hardware employed while allowing improved reconfigurability.

SUMMARY OF THE INVENTION

To address the above-discussed deficiencies of the prior art, it is a primary object of the present invention to provide, for use in a channel decoder, a block decision feedback equalizer designed by deriving, from first principles, a block exact decision feedback equalizer and then systematically applying simplifying assumptions to obtain several block approximate decision feedback equalizers, each suitable for multipath channel equalization and having error convergence insensitive to filter length. The resulting block decision feedback equalizer is software definable and may be dynamically adapted by choosing whether to update error correction coefficients.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art will appreciate that they may readily use the conception and the specific embodiment disclosed as a basis for modifying or designing other structures for carrying out the same purposes of the present invention. Those skilled in the art will also realize that such equivalent constructions do not depart from the spirit and scope of the invention in its broadest form.

Before undertaking the DETAILED DESCRIPTION OF THE INVENTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 10, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged device.

Figure 1:
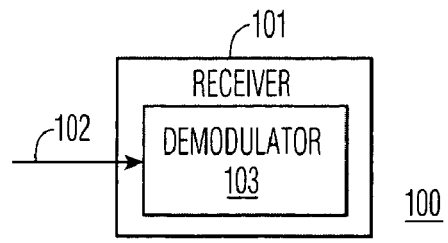
FIG. 1 depicts a receiver system including a block adaptive decision feedback equalizer for improved channel equalization according to one embodiment of the present invention.

FIG. 1 depicts a receiver system including a block adaptive decision feedback equalizer for use in channel equalization according to one embodiment of the present invention. Receiver system 100 includes a receiver 101, which is a digital television (DTV) and/or software-defined radio (SDR) receiver in the exemplary embodiment. Receiver 101 includes an input 102 for receiving video signals and a demodulator (channel decoder) 103 including a decision feedback equalizer as described in greater detail below.

The present invention may also be employed for any receiver such as, for example, a broadband wireless Internet access receiver, a cable, satellite or terrestrial broadcast television receiver unit for connection to a television, or any other video device receiving encoded video information such as a video cassette recorder (VCR) or digital versatile disk (DVD) player. Regardless of the embodiment, however, receiver 101 includes a demodulator 103 employing a block adaptive decision feedback equalizer for improved channel equalization in accordance with the present invention, as described in further detail below.

Those skilled in the art will perceive that FIG. 1 does not explicitly depict every component within a receiver system. Only those portions of such a system that are unique to the present invention and/or required for an understanding of the structure and operation of the present invention are shown.

To improve flexibility while minimizing hardware implementation costs, a software decision feedback equalizer or combined software/hardware decision feedback equalizer would be desirable. However, current hardware decision feedback equalizer implementations are inherently sequential sample-by-sample processing algorithms, while software components are efficient for block-based algorithms where data is processed in blocks to reduce overhead, maximize parallelism, and make possible transformation of operations to forms having lower computational requirements.

In the subsequent description, the following notations are employed: matrices and vectors are represented by boldfaced characters, with boldfaced uppercase characters (e.g., H) identifying a matrix while a boldfaced lowercase character with an overbar (e.g., $\bar{h}$) identifies a vector and lowercase italicized characters without an overbar (e.g., h) identify a scalar quantity. Discrete time varying variables (e.g., x) are represented either as $x(n)$ or $x_n$. A point-wise inner product matrix operator $\square$ is defined as:

$$\begin{bmatrix} \bar{h}(n) \\ \bar{h}(n-1) \end{bmatrix} \square \begin{bmatrix} \bar{x}_n \\ \bar{x}_{n-1} \end{bmatrix} =$$

$$diag\left(\begin{bmatrix} \bar{h}(n) & 0 \\ 0 & \bar{h}(n-1) \end{bmatrix} \begin{bmatrix} \bar{x}_n^T & 0 \\ 0 & \bar{x}_{n-1}^T \end{bmatrix}\right) = \begin{bmatrix} \bar{h}(n)\bar{x}_n^T \\ \bar{h}(n-1)\bar{x}_{n-1}^T \end{bmatrix}$$

and has the important property of being distributive over addition:

$$\left(\begin{bmatrix} \bar{h}_1(n) \\ \bar{h}_1(n-1) \end{bmatrix} + \begin{bmatrix} \bar{h}_2(n) \\ \bar{h}_2(n-1) \end{bmatrix}\right) \square \begin{bmatrix} \bar{x}_n \\ \bar{x}_{n-1} \end{bmatrix} = diag\left(\begin{bmatrix} \bar{h}_1(n) + \bar{h}_2(n) & 0 \\ 0 & \bar{h}_1(n-1) + \bar{h}_2(n-1) \end{bmatrix}\right.$$

$$\left.\begin{bmatrix} \bar{x}_n^T & 0 \\ 0 & \bar{x}_{n-1}^T \end{bmatrix}\right)$$

$$= \begin{bmatrix} \bar{h}_1(n)\bar{x}_n^T \\ \bar{h}_1(n-1)\bar{x}_{n-1}^T \end{bmatrix} + \begin{bmatrix} \bar{h}_2(n)\bar{x}_n^T \\ \bar{h}_2(n-1)\bar{x}_{n-1}^T \end{bmatrix}$$

$$= \begin{bmatrix} \bar{h}_1(n) \\ \bar{h}_1(n-1) \end{bmatrix} \square \begin{bmatrix} \bar{x}_n \\ \bar{x}_{n-1} \end{bmatrix} + \begin{bmatrix} \bar{h}_2(n) \\ \bar{h}_2(n-1) \end{bmatrix} \square \begin{bmatrix} \bar{x}_n \\ \bar{x}_{n-1} \end{bmatrix}$$

The design of a block adaptive decision feedback equalizer in the present invention begins with the equations governing sample-by-sample decision feedback equalization, in which L is the length of the forward filter and M is the length of the feedback filter, while $\bar{h}_f$ is the coefficient vector of the forward filter, $\bar{h}_b$ is the coefficient vector of the feedback filter, $x(n)$ is the input sample at the $n^{th}$ time-index and $y(n)$ is the output of the decision feedback equalizer at the $n^{th}$ time-index. The filter update is then given by:

$$\bar{h}_f(n)=\bar{h}_f(n-1)+\mu e_{n-1}\bar{x}_{n-1} \quad (1a)$$

$$\bar{h}_b(n)=\bar{h}_b(n-1)+\mu e_{n-1}\bar{d}_{n-1} \quad (1b)$$

and the filtering equation is given by:

$$y(n)=y_n=\bar{h}_f(n)\bar{x}_n+\bar{h}_b(n)\bar{d}_{n-1} \quad (2)$$

where $$\bar{x}_n=[x(n)x(n-1) \ldots x(n-L+1)]$$

$$\bar{d}_n=[d(n-1)x(n-2) \ldots d(n-M+1)]$$

$$\bar{h}_f=[h_{f,0},h_{f,1} \ldots h_{f,L-1}]$$

$$\bar{h}_b=[h_{b,0},h_{b,1} \ldots h_{b,M-1}]$$

and $d(n)=d_n=f(y_n)$ (where $f(\ )$ is a constellation de-mapping function) while $e_n=g(u(n),d_n,y_n)$ is an error term being minimized according to some known criteria which may or may not use a known transmitted symbol $u(n)$. For example, a least means square (LMS) adaptive equalizer would calculate $e_n=u(n)-y_n$. A blind Godard algorithm, on the other hand, may use $e_n=-y_n(y^2_{n-\lambda})$.

The total number of computations for the filter update and the filtering, ignoring the multiplication by $\mu$ in equations (1a) and (1b) and the calculation of the error itself, is 2 (L+M) multiplications and (2L+2M−1) additions, respectively, in one sample period $T_s$. The number of storage elements is proportional to L+M, the size of the state vector.

Assuming that the input and the output of the desired block adaptive decision feedback equalizer are blocks of N samples, a "direct form" block decision feedback equalizer may be implemented utilizing the equations of a sample-by-sample decision feedback equalizer repeated on every sample of the block. The number of operations and the performance remains the same, except that more storage is required and a pipeline delay of $NT_s$ is introduced. The filtering equations for the direct form block decision feedback equalizer may be written as:

$$\begin{bmatrix} y_n \\ y_{n-1} \\ \vdots \\ y_{n-N+1} \end{bmatrix} = \begin{bmatrix} \bar{h}_f(n) \\ \bar{h}_f(n-1) \\ \vdots \\ \bar{h}_f(n-N+1) \end{bmatrix} \square \begin{bmatrix} \bar{x}_n \\ \bar{x}_{n-1} \\ \vdots \\ \bar{x}_{n-N+1} \end{bmatrix} + \begin{bmatrix} \bar{h}_b(n) \\ \bar{h}_b(n-1) \\ \vdots \\ \bar{h}_b(n-N+1) \end{bmatrix} \square \begin{bmatrix} \bar{d}_n \\ \bar{d}_{n-1} \\ \vdots \\ \bar{d}_{n-N+1} \end{bmatrix} \quad (3)$$

Substituting the update equations (1a) and (1b) into equation (3) recursively:

$$\begin{aligned} \bar{h}_f(n-k) &= \bar{h}_f(n-k-1) + \mu e_{n-k-1} \bar{x}_{n-k-1}^T \\ &= \bar{h}_f(n-k-2) + \mu e_{n-k-2} \bar{x}_{n-k-2}^T + \mu e_{n-k-1} \bar{x}_{n-k-1}^T \\ &= \bar{h}_f(n-N) + \mu \sum_{i=k+1}^{N} e_{n-i} \bar{x}_{n-i}^T \end{aligned} \quad (4a)$$

$$\bar{h}_b(n-k) = \bar{h}_b(n-N) + \mu \sum_{i=k+1}^{N} e_{n-i} \bar{d}_{n-i}^T \quad (4b)$$

Equation (3) may therefore be rewritten as:

$$\begin{bmatrix} y_n \\ y_{n-1} \\ \vdots \\ y_{n-N+1} \end{bmatrix} = \begin{bmatrix} \bar{x}_n \\ \bar{x}_{n-1} \\ \vdots \\ \bar{x}_{n-N+1} \end{bmatrix} \bar{h}_f(n-N)^T + \begin{bmatrix} \bar{d}_n \\ \bar{d}_{n-1} \\ \vdots \\ \bar{d}_{n-N+1} \end{bmatrix} \bar{h}_b(n-N)^T + \begin{bmatrix} \bar{x}_n \\ \bar{x}_{n-1} \\ \vdots \\ \bar{x}_{n-N+1} \end{bmatrix}$$

$$\square \begin{bmatrix} \mu \sum_{i=1}^{N} e_{n-i} \bar{x}_{n-i} \\ \vdots \\ \mu \sum_{i=N}^{N} e_{n-i} \bar{x}_{n-i} \end{bmatrix} + \begin{bmatrix} \bar{d}_n \\ \bar{d}_{n-1} \\ \vdots \\ \bar{d}_{n-N+1} \end{bmatrix} \square \begin{bmatrix} \mu \sum_{i=1}^{N} e_{n-i} \bar{d}_{n-i} \\ \vdots \\ \mu \sum_{i=N}^{N} e_{n-i} \bar{d}_{n-i} \end{bmatrix} = A + B + C + D \quad (5)$$

Terms C and D within equation (5) may be re-written as:

$$C = \begin{bmatrix} \bar{x}_n \\ \bar{x}_{n-1} \\ \vdots \\ \bar{x}_{n-N+1} \end{bmatrix} \square \begin{bmatrix} \mu \sum_{i=1}^{N} e_{n-i} \bar{x}_{n-i} \\ \vdots \\ \mu \sum_{i=N}^{N} e_{n-i} \bar{x}_{n-i} \end{bmatrix} = \mu \left[ \sum_{i=1}^{N} e_{n-i} \bar{x}_n \bar{x}_{n-i}^T \cdots \sum_{i=1}^{N} e_{n-i} \bar{x}_n \bar{x}_{n-i}^T \right]^T \quad (6a)$$

$$= \mu \left[ \sum_{i=1}^{N} e_{n-i} \tilde{R}_{x:i} \sum_{i=2}^{N} e_{n-i} \tilde{R}_{x:i-1} \cdots e_{n-N} \tilde{R}_{x:1} \right]^T = [C_0 \; C_1 \cdots C_{N-1}]$$

where $C_j = \mu \sum_{i=j+1}^{N} e_{n-i} \tilde{R}_{x:i-j}$, and $$D = [D_0 D_1 \ldots D_{N-1}] \quad (6b)$$

where $$D_j = \mu \sum_{i=j+1}^{N} e_{n-i} \tilde{R}_{d:i-j}.$$

The block update equation is derived from equations (4a) and (4b) by setting k=0:

$$\bar{h}_f(n) = \bar{h}_f(n-N) + \mu \sum_{i=1}^{N} e_{n-i} \bar{x}_{n-i}^T \quad (7a)$$

$$\bar{h}_b(n) = \bar{h}_b(n-N) + \mu \sum_{i=1}^{N} e_{n-i} \bar{d}_{n-i}^T \quad (7b)$$

Equations (5), (7a) and (7b) fully define an exact block implementation of the sample-by-sample adaptive decision feedback equalization algorithm, which may be referred to as a "block exact" decision feedback equalizer.

Figure 2A:
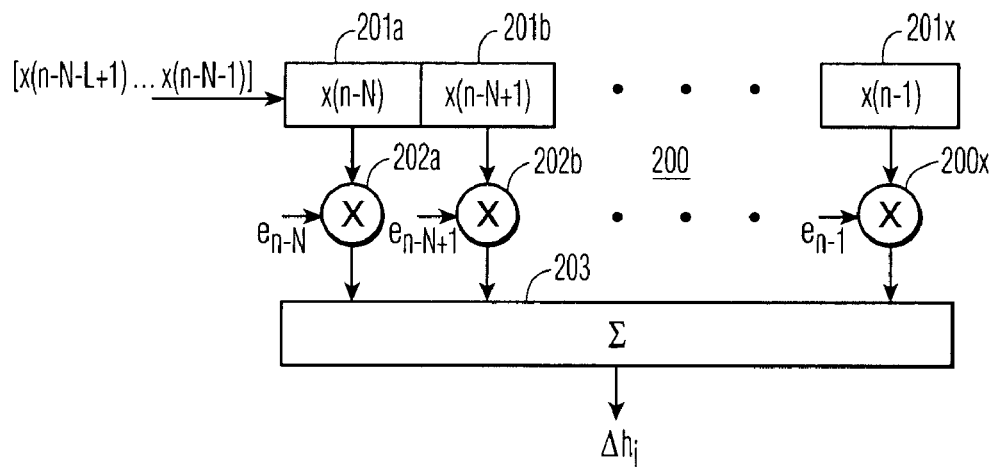
FIGS. 2A–2C illustrate a block exact decision feedback equalizer according to one embodiment of the present invention.

FIG. 2A illustrates the forward filter update portion of the block decision feedback equalizer according to one embodiment of the present invention, viewed as a filtering operation. The forward filter 200, corresponding to equation (7a), computes the second term within equation (7a), a differential forward filter update term $$\Delta \overline{h}_f = \sum_{i=1}^{N} e_{n-i} \overline{x}_{n-i}^T$$

for the N samples within the subject block. The filter starts with an initial state [x(n−1) . . . x(n−N)], with buffers 201a–201x holding the N samples received for the subject block. When the corresponding error vector [e(n−1) . . . e(n−N)] has only one element for each sample, equation (7a) reduces to a sample-by-sample decision feedback equalizer update equation. Accordingly, signal multipliers 202a–202x multiply each sample within the block by the corresponding error vector element. The results are then added by summing unit 203, producing the differential forward filter update term.

In reviewing the block update equations, it is important to note that the first two terms A and B in equation (5) are implemented by finite impulse response (FIR) filters with fixed coefficients over the entire block and therefore may be implemented with fast FIR algorithms. Terms C and D may be viewed as intra-block time varying filters.

Evaluating the computational complexity of the block exact decision feedback equalizer is complex. Facially, the block exact decision feedback equalizer requires more computation since the terms C and D in equation (5) add an additional $O(N^2)$ multiplication. However, if the block size N is small compared to the feed-forward and feedback filter lengths L and M, respectively, then the savings provided by fast FIR algorithms for terms A and B more than compensates for the additional overhead. On the other hand, if N is sufficiently large, the block exact decision feedback equalizer consumes more computations than the sample-by-sample decision feedback equalizer.

In order to employ fast FIR algorithms, the filter coefficients must be fixed, which is achieved by the block exact decision feedback equalizer formulation. To remove the overhead due to the correction terms C and D, simplifying assumptions drawn from the problem domain for which the block decision feedback equalizer is being applied are examined in hope of reducing the complexity while retaining the simplicity of the FIR structure. In this regard, the signal processing structures implied by equations (5), (7a) and (7b) are of interest. Starting from the block update equation (7a), which may be written as:

$$\overline{h}_f(n) = \overline{h}_f(n-N) + \mu \sum_{i=1}^{N} e_{n-i} \overline{x}_{n-i} = \overline{h}_f(n-N) + \mu \Delta \overline{h}_f(n)$$

Let $\Delta \overline{h}_f(n) = [\Delta h_0 \ldots \Delta h_{L-1}]$, where $$\begin{bmatrix} \Delta h_0 \\ \vdots \\ \Delta h_{L-1} \end{bmatrix} =$$

$$\sum_{i=1}^{N} e_{n-i} \overline{x}_{n-i}^T = e_{n-1} \begin{bmatrix} x(n-1) \\ \vdots \\ x(n-L) \end{bmatrix} + \cdots + e_{n-N} \begin{bmatrix} x(n-N) \\ \vdots \\ x(n-N-L+1) \end{bmatrix} \Rightarrow \Delta h_j =$$

-continued $$e_{n-1}(n-1-j) + \cdots e_{n-N} x(n-N-j) \Rightarrow \Delta h_j = \sum_{k=n-1}^{n-N} e_k x(k-j)$$

Therefore, the new filter coefficient vector $\overline{h}_f(n)$ of the forward filter may be interpreted to be the sum of $\overline{h}_f(n-N)$ and the result of filtering the state vector $\overline{x}_{n-i}^T$ through a filter whose coefficients are the elements of the error vector. The same procedure may also be applied to the feedback filter.

Figure 2B:
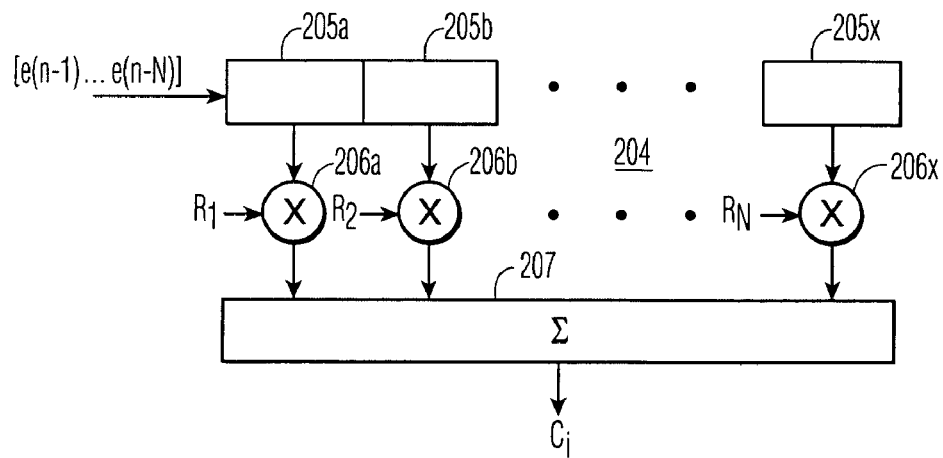

FIG. 2B illustrates computation of intra-block time varying output correction factors within the forward filter update portion of the block decision feedback equalizer according to one embodiment of the present invention, viewed as a filtering operation. The structure required for computing intra-block time-varying output correction factors terms C and D within equation (5) is derived by expanding equations (6a) and (6b), for example:

$$D_j = \mu \sum_{i=j+1}^{N} e_{n-i} \tilde{R}_{d:i-j}$$

$$D_0 = \mu \left( e_{n-1} \tilde{R}_{d:1} + e_{n-2} \tilde{R}_{d:2} + \cdots + e_{n-N} \tilde{R}_{d:N} \right)$$

$$D_1 = \mu \left( e_{n-2} \tilde{R}_{d:1} + e_{n-3} \tilde{R}_{d:2} + \cdots + e_{n-N} \tilde{R}_{d:N} \right)$$

$$\vdots$$

$$D_{N-1} = \mu \left( e_{n-N} \tilde{R}_{d:N} \right)$$

The requisite structure 204 may therefore be viewed as a filter R with coefficients $R_1$ through $R_N$. In this case, the filter 204 starts with a zero state every buffer block 205a–205x and stops when all the error values have been shifted in. The error values are multiplied by coefficients $R_1$ through $R_N$ by signal multipliers 206a–206x, the outputs of which are accumulated by summing unit 207. The output of summing unit 207 is sequenced starting with $C_{N-1}$ or $D_{N-1}$ and ending with $C_0$ or $D_0$.

Figure 2C:
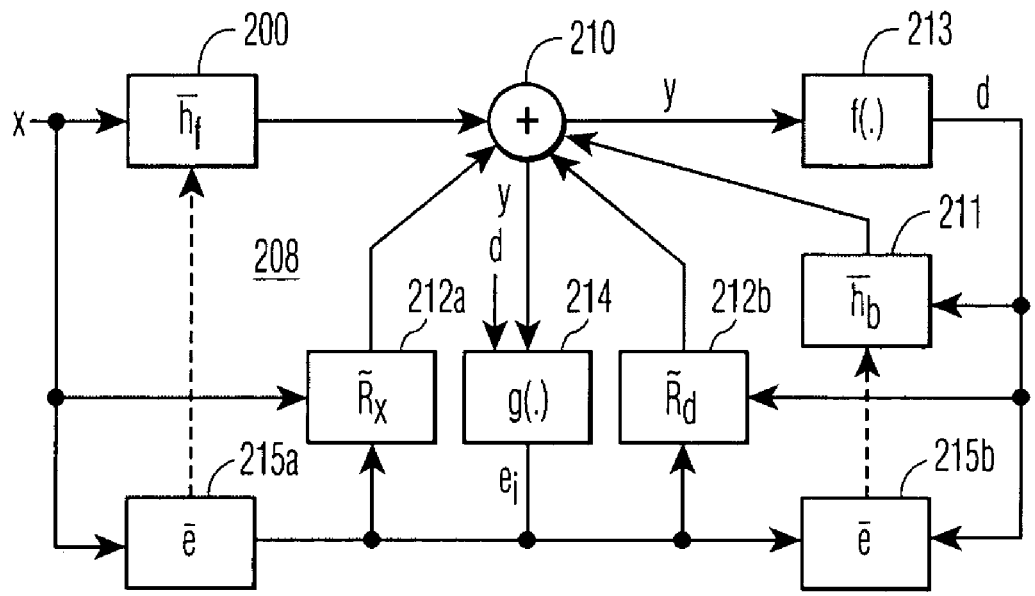

FIG. 2C is a block diagram of the overall structure of a block exact decision feedback equalizer according to one embodiment of the present invention. Block exact decision feedback equalizer (BE-DFE) 208 includes an input receiving samples x(n), which are passed to forward filter 200. The output of forward filter 200 is added by signal adder 210 to the outputs of feedback filter 211 and intra-block time varying filters 212a and 212b. The output of signal adder 210 is passed to constellation demapping unit 213 and to sample error computation unit 214. Sample error computation unit 214 also receives the demapped samples d(n) from demapping unit 213. Coefficient update units 215a and 215b compute the error vectors for forward filter 200 and feedback filter 211, respectively.

Figure 3:
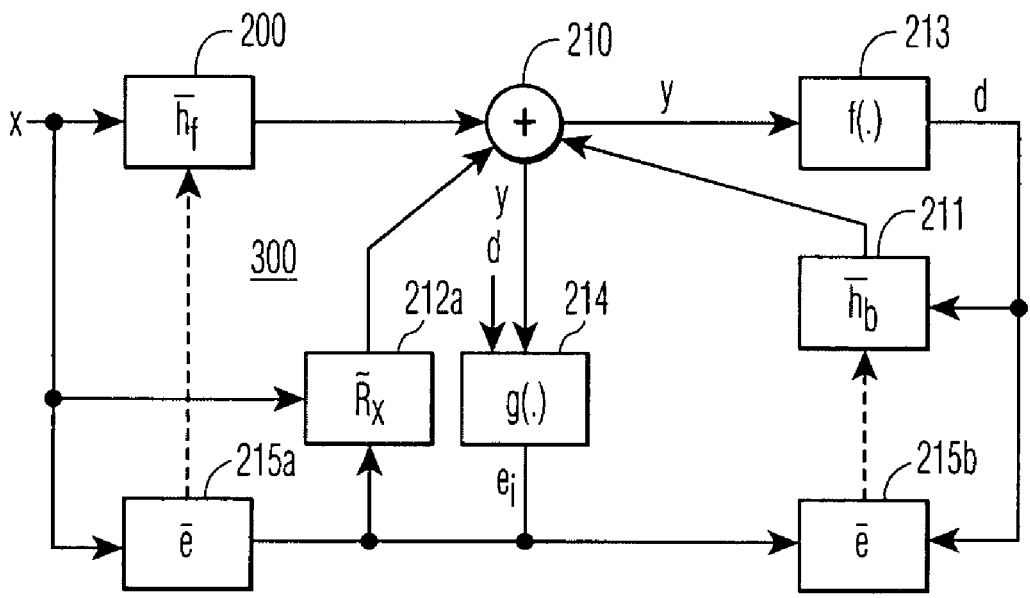
FIG. 3 illustrates a block approximate decision feedback equalizer according to one embodiment of the present invention.

FIG. 3 illustrates a block approximate decision feedback equalizer according to one embodiment of the present invention. The sample-by-sample decision feedback equalizer algorithms employed above to derive a block exact decision feedback equalizer form a reference for a block adaptive decision feedback equalizer, but do not need to be implemented exactly. As long as the transient adaptive behavior is satisfactory and the residual error at convergence compares favorably with the sample-by-sample decision feedback equalizer algorithm, any block decision feedback equalizer algorithm may be applied. Starting from the block exact decision feedback equalizer, if a set of simplifying assumptions that may be valid in the problem domain are systematically applied, a family of block decision feedback algorithms may be derived. Members of this family are referred to as block approximate decision feedback equalizer (BA-DFE), and are similar to the block approximate linear adaptive filters known in the art. Since the terms C and D in equation (5) add to the computation, reduction or removal of computation complexity for these terms is examined first.

It is known that the Advanced Television Systems Committee (ATSC) digital television standard vestigial sideband modulation (VSB) reception is multi-path limited, requiring typically long feed forward and feed back sections of the decision feedback equalizer, typically a forward filter length L=128 and a feedback filter length M>256. In equation (6), $\tilde{R}_{x:i} = \bar{x}_n \bar{x}_{n-i}^T$ and for large forward filter lengths L, $\tilde{R}_{x:i}/L$ can be treated as an estimate of the auto correlation of x. Normally, the statistic of the received signal changes slowly relative to the signal itself. Therefore $\tilde{R}_{x:i}/L$ may be computed at a much lower rate than the rate at which the adaptive filter works. In the case of the ATSC signal, the symbol rate is 10.76 MHz whereas the multi-path channel characteristics is expected to change slowly, in the order of 100 Hz. By the preceding analysis, $\tilde{R}_{x:i}/L$ may be computed almost once in $10^4$ samples and therefore the forward filter 200 in FIG. 2C may be viewed as a fixed coefficient FIR filter that requires N(N+1)/2 multiplications. Furthermore, $\tilde{R}_{x:i}$ is also typically sparse and has fewer than N non-zero terms, say $N_1$. Therefore the computations required by the correction term in a block approximate decision feedback equalizer will only be of the order of $NN_1$. In addition, any savings accruing to conventional fast FIR algorithms may be obtained.

At the next step of simplification, setting one or both of the $\tilde{R}_{:i}$ terms to zero is examined. Once the equalizer has converged at $T_\infty$, almost all of the multi-path interference may be assumed to have been cancelled. Accordingly the output autocorrelation function is an impulse. Therefore at $T_\infty$, $\tilde{R}_{d:i} \approx 0$, and hence the term D can be dropped from equation (5) without affecting the residual error. However, in the transient or the tracking phase, the absence of this term is like adding an error into the input of the decision device, which is expected to contribute to an increase in the error propagation of the decision feedback equalizer.

Since, the decision device is typically non-linear, this error term is non-zero if and only if $D > \delta_{min}$, where $\delta_{min}$ depends on the choice of the forward section. For example, if the forward section compensates fully for the channel, then $\delta_{min} = \infty$. Therefore, one way to minimize the error propagation due to this approximation will be to start the forward equalizer before the feed back filter. However, careful consideration of noise amplification by the feed forward filter in a deep fade is required. Start the decision feedback equalizer with a smaller $\mu$ for the feedback section may therefore be better.

Equation (8) below is the governing equation for the filtering part of the block approximate decision feedback equalizer 300 depicted in FIG. 3:

$$\begin{bmatrix} y_n \\ y_{n-1} \\ \vdots \\ y_{n-N+1} \end{bmatrix} = \begin{bmatrix} \bar{x}_n \\ \bar{x}_{n-1} \\ \vdots \\ \bar{x}_{n-N+1} \end{bmatrix} \bar{h}_f(n-N)^T + \begin{bmatrix} \bar{d}_n \\ \bar{d}_{n-1} \\ \vdots \\ \bar{d}_{n-N+1} \end{bmatrix} \bar{h}_b(n-N)^T + \begin{bmatrix} \vdots \\ \vdots \\ \mu \sum_{i=j+1}^{N} e_{n-i} \tilde{R}_{x:i-j} \\ \vdots \end{bmatrix} \quad (8)$$

The structure and operation of the block approximate decision feedback equalizer (BA-DFE-I) 300 is essentially the same as the structure and operation of the block exact decision feedback equalizer except: (1) the intra-block time varying filter 212b with coefficients $\tilde{R}_{d:i}$ for the feedback filter 211 is eliminated, and (2) the intra-block time varying filter 212a is computed with coefficients $\tilde{R}_{x:i}$, which is updated at very low rates, from measurements on input samples.

Figure 4:
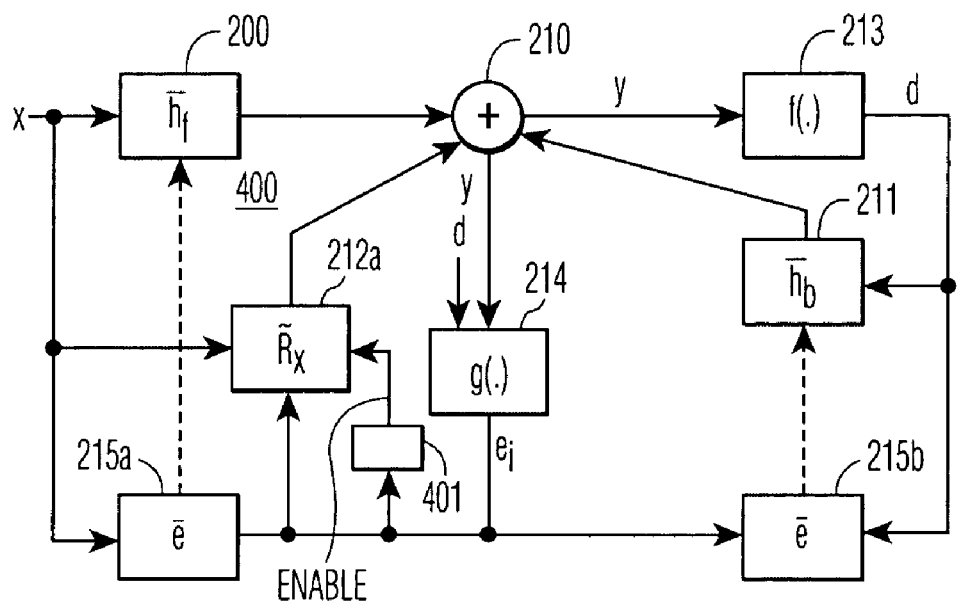
FIG. 4 illustrates a block approximate decision feedback equalizer according to another embodiment of the present invention.

FIG. 4 illustrates a block approximate decision feedback equalizer according to another embodiment of the present invention. Once the filter has converged, $\|\bar{e}\| \approx 0$ and therefore the correction term in equation (8) approaches zero. At this point, the filter coefficients have converged to the minima and the correction term is no longer needed. Thus, the block approximate decision feedback equalizer (BA-DFE-II) 400 in this embodiment includes a trigger function 401 which monitors some norm of the error vector, for example the mean standard error or the error variance. If the monitored norm is large (i.e., above some threshold), the intra-block time varying filter 212a with coefficients $\tilde{R}_x$ is enabled. If the monitored norm is below the threshold, filter 212a is disabled. Normally, filter 212a will be required only during the channel acquisition period, and at all other times these resources may be used for other computations or simply powered down.

In addition, this embodiment serves to keep the error propagation of the decision feedback equalizer at the same levels as the embodiment in FIG. 3 while reducing the number of operations in steady state. The equations governing operation of the block approximate decision feedback equalizer 400 are equations (7a) and (7b) and:

$$\begin{bmatrix} y_n \\ y_{n-1} \\ \vdots \\ y_{n-N+1} \end{bmatrix} = \begin{bmatrix} \bar{x}_n \\ \bar{x}_{n-1} \\ \vdots \\ \bar{x}_{n-N+1} \end{bmatrix} \bar{h}_f(n-N) + \begin{bmatrix} \bar{d}_n \\ \bar{d}_{n-1} \\ \vdots \\ \bar{d}_{n-N+1} \end{bmatrix} \bar{h}_b(n-N) + \begin{bmatrix} \vdots \\ \mu \sum_{i=j+1}^{N} e_{n-i} \tilde{R}_{x:i-j} \\ \vdots \end{bmatrix} ; \text{if } \|\bar{e}\| > \delta \quad (9)$$

$$= \begin{bmatrix} \overline{x}_n \\ \overline{x}_{n-1} \\ \vdots \\ \overline{x}_{n-N+1} \end{bmatrix} \overline{h}_f(n-N) + \begin{bmatrix} \overline{d}_n \\ \overline{d}_{n-1} \\ \vdots \\ \overline{d}_{n-N+1} \end{bmatrix} \overline{h}_b(n-N); \text{ elsewhere}$$

Figure 5:
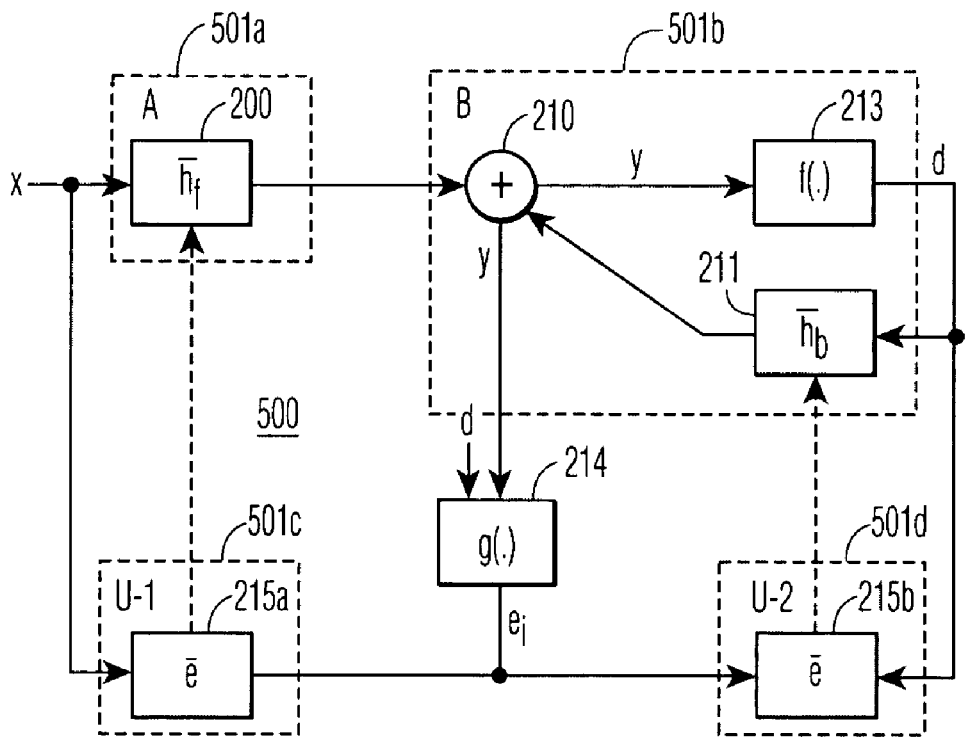
FIG. 5 illustrates a block approximate decision feedback equalizer according to still another embodiment of the present invention.

FIG. 5 illustrates a block approximate decision feedback equalizer according to still another embodiment of the present invention. Block updates may be viewed as a noisy adaptation algorithm, and the correction terms eliminated altogether as in block approximate decision feedback equalizer (BA-DFE-III) 500. Both intra-block time varying filters 212a and 212b have been eliminated, and the block filtering operations have been logically divided into four segments 501a–501d labeled A, B, U-1 and U-2, respectively.

Block approximate decision feedback equalizer 500 is related to the Block approximate decision feedback equalizer 400 in FIG. 4 by the following equations:

$$\begin{bmatrix} \tilde{y}_n \\ \tilde{y}_{n-1} \\ \vdots \\ \tilde{y}_{n-N+1} \end{bmatrix} = \begin{bmatrix} \overline{x}_n \\ \overline{x}_{n-1} \\ \vdots \\ \overline{x}_{n-N+1} \end{bmatrix} \overline{h}_f(n-N) + \begin{bmatrix} \tilde{d}_n \\ \tilde{d}_{n-1} \\ \vdots \\ \tilde{d}_{n-N+1} \end{bmatrix} \overline{h}_b(n-N) \quad (10a)$$

$$\tilde{y}_n = y_n - \mu \sum_{i=1}^{N} e_{n-i} \tilde{R}_{x:i} \quad (10b)$$

$$\tilde{d}_n = f(\tilde{y}_n) \quad (10c)$$

Analytically determining the effect of the modified input to the decision device is difficult since the effect depends on the signal characteristics. While this approximation may lead to divergence in the presence of correlated noise, in the case of a multipath channel with slowly varying channels, the approximation is expected to hold as long as the error propagation in the feedback section is sufficiently small.

Since the block update algorithm is already formulated as a filtering operation on the input and decision vectors with the error vector as the coefficients, the update portions (blocks U-1 501c and U-2 501d) of the block approximate decision feedback equalizer 500 may be implemented using the fast Fourier transforms (FFTs). With the forward filter 200 (block A 501a) also implemented using FFTs, a frequency domain equalizer equivalent to the time domain block equalizer may be derived. Such implementation of these blocks as FFTs is straightforward. This means that based on the size of the filters or other appropriate cost criteria, one implementation may be chosen over the other, with similar performance.

FIGS. 6 through 10 are plots for simulation results relating to the performance of a block approximate decision feedback equalizer according to various embodiments of the present invention. Simulations were performed: to verify the analytical discussion regarding development of a block approximate decision feedback equalizer above; to verify that the block approximation holds for the decision feedback equalizer in a multi-path channel and that the equalizer converges for various block sizes; to show that the block approximate DFE structure is independent of the adaptive algorithm that is selected and to show that the block decision feedback equalizer performs as well as the sample-by-sample decision feedback. Moreover, these factors are shown for both short and long filter lengths to demonstrate that there is no sensitivity to filter lengths.

Figure 6:
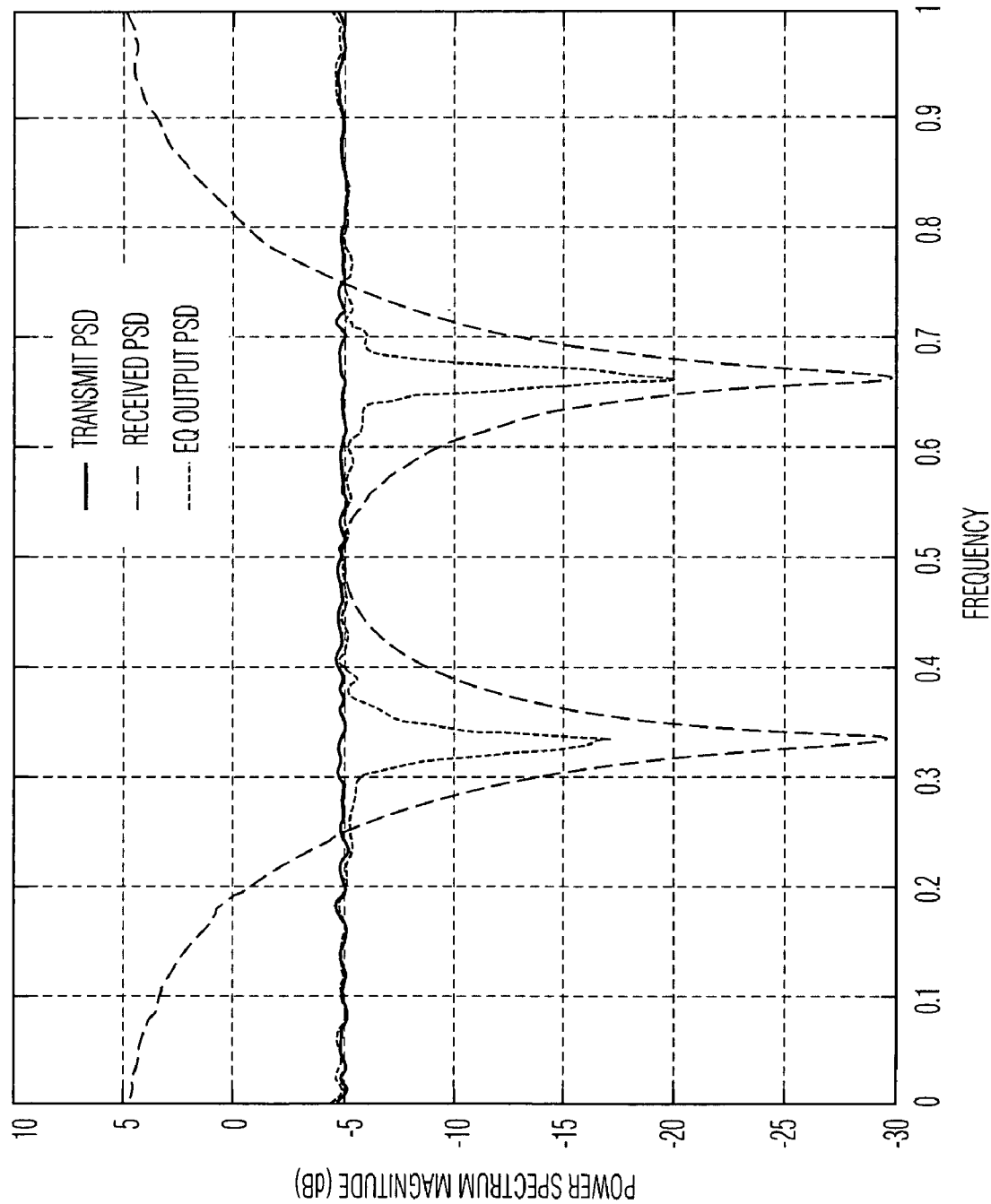
FIGS. 6 through 10 are plots for simulation results relating to the performance of a block approximate decision feedback equalizer according to various embodiments of the present invention.

Each of the simulations was performed with the 8-level VSB (VSB-8) constellation, with the multipath channel modeled as an FIR filter $$x(n) = \sum_i h_i u(n-i),$$

where u(n) is the transmitted signal and x(n) is the received signal. A channel having three paths with two close-in reasonably strong echoes is assumed:

Channel 1: h=[0.25 0 1 0 0.25]
Channel 2: h=[0.5 0 1 0 0.5]
Channel 3: h=[1 0 1 0 1]

resulting in a very strong frequency selective fade for channel 3 as shown in FIG. 6. Although the channel is not very long, long equalizers are needed to cancel out the deep fade and the simulation is therefore sufficient for the purposes of showing that a block decision feedback equalizer is feasible.

FIG. 6 shows that the block decision feedback equalizer with fairly large L and M is able to cancel out the channel interference. Power spectral density of transmit, received and equalized outputs are plotted for a block decision feedback equalizer having a forward filter length L=128, a feedback filter length M=256, a block size N=64 samples, and a normalized least mean squares (NLMS) error correction algorithm.

An important feature of the block approximate decision feedback equalizer 300, 400 and 500 is the separation of the error calculation algorithm from the filtering and update portions of equalization, so that the assumptions employed in designing the respective equalizers apply equally to any of the various least squares adaptive algorithms that exist for FIR transversal filtering. Using the block adaptive decision feedback equalizer 500 of FIG. 5 for channels 1 through 3, the effect of block size on error convergence was studied for blind Godard, least mean square (LMS) and normalized least mean square (NLMS) algorithms with block sizes of 1, 4 and 64 samples. In all cases, the block decision feedback equalizer converged almost as well as the sample-by-sample decision feedback equalizer, as shown by FIGS. 7 through 9.

Figure 7:
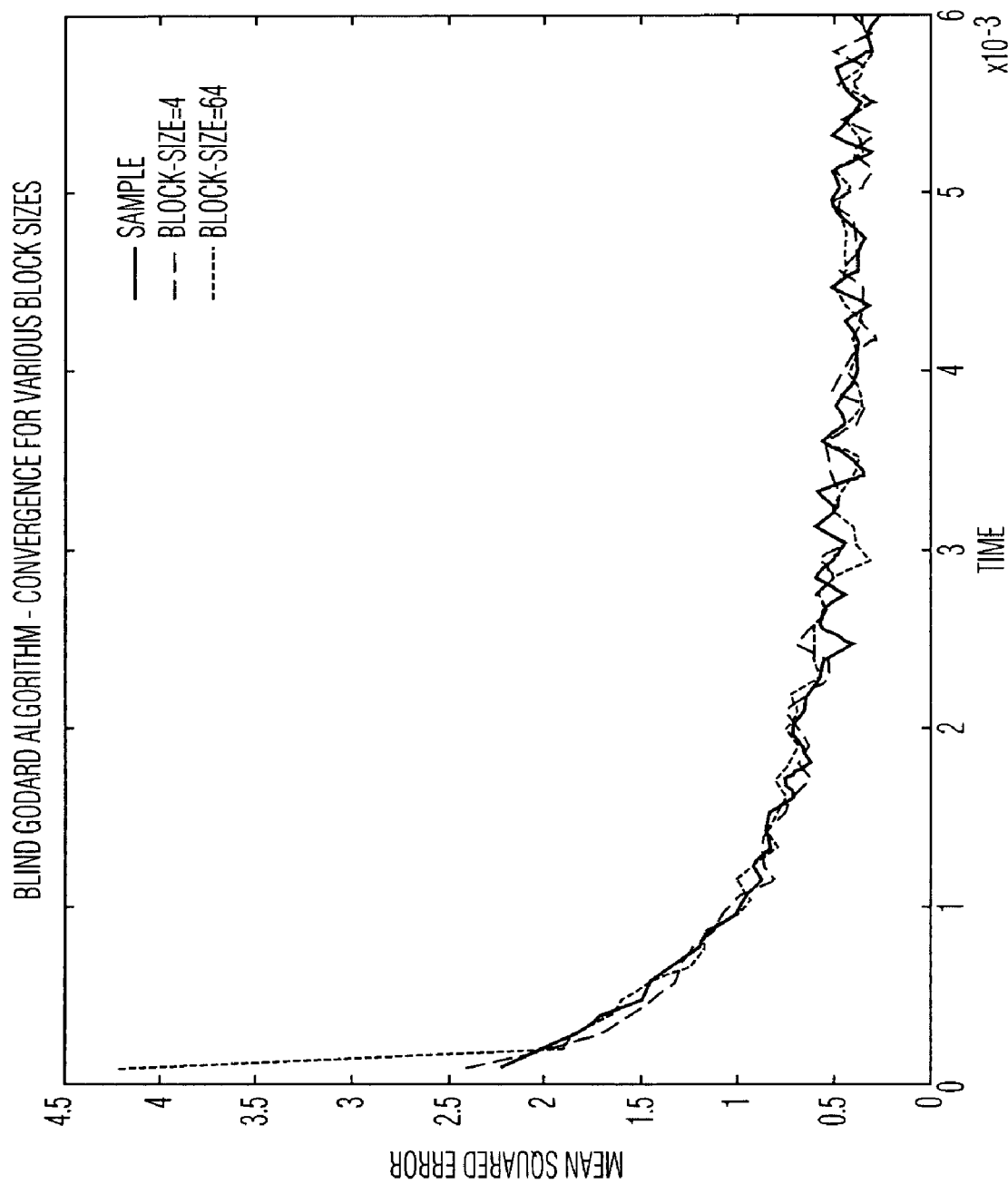

FIG. 7 illustrates error convergence for channel 1 using a forward filter length L=8, feedback filter length M=4, block sizes N=1, 4 and 64 samples, and a blind Godard error correction algorithm. The effect of blocking is negligible.

Figure 8:
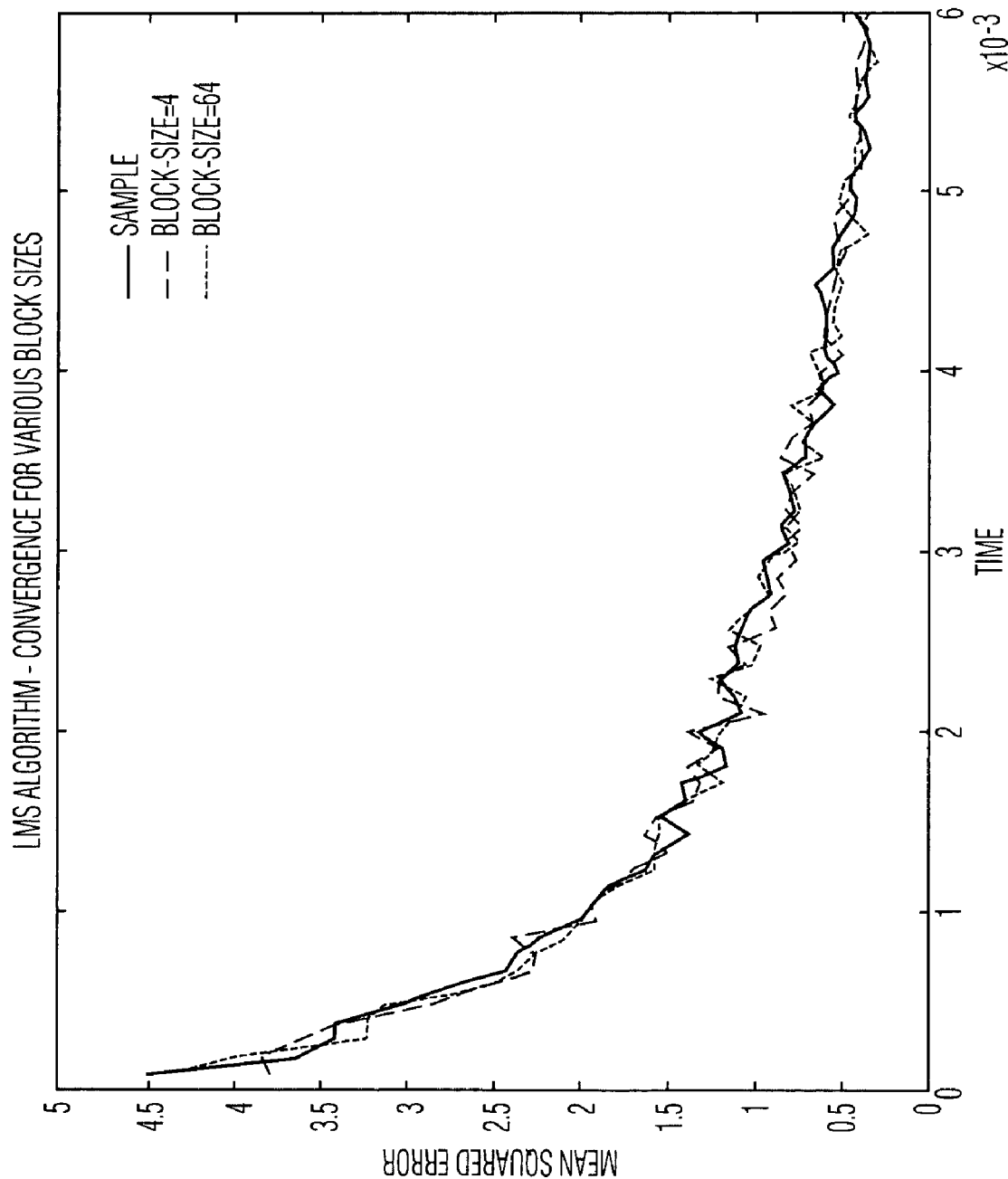

FIG. 8 illustrates error convergence for channel 2 using a forward filter length L =8, feedback filter length M=4, block sizes N=1, 4 and 64 samples, and a least mean square (LMS) error correction algorithm. The effect of blocking is again negligible.

Figure 9:
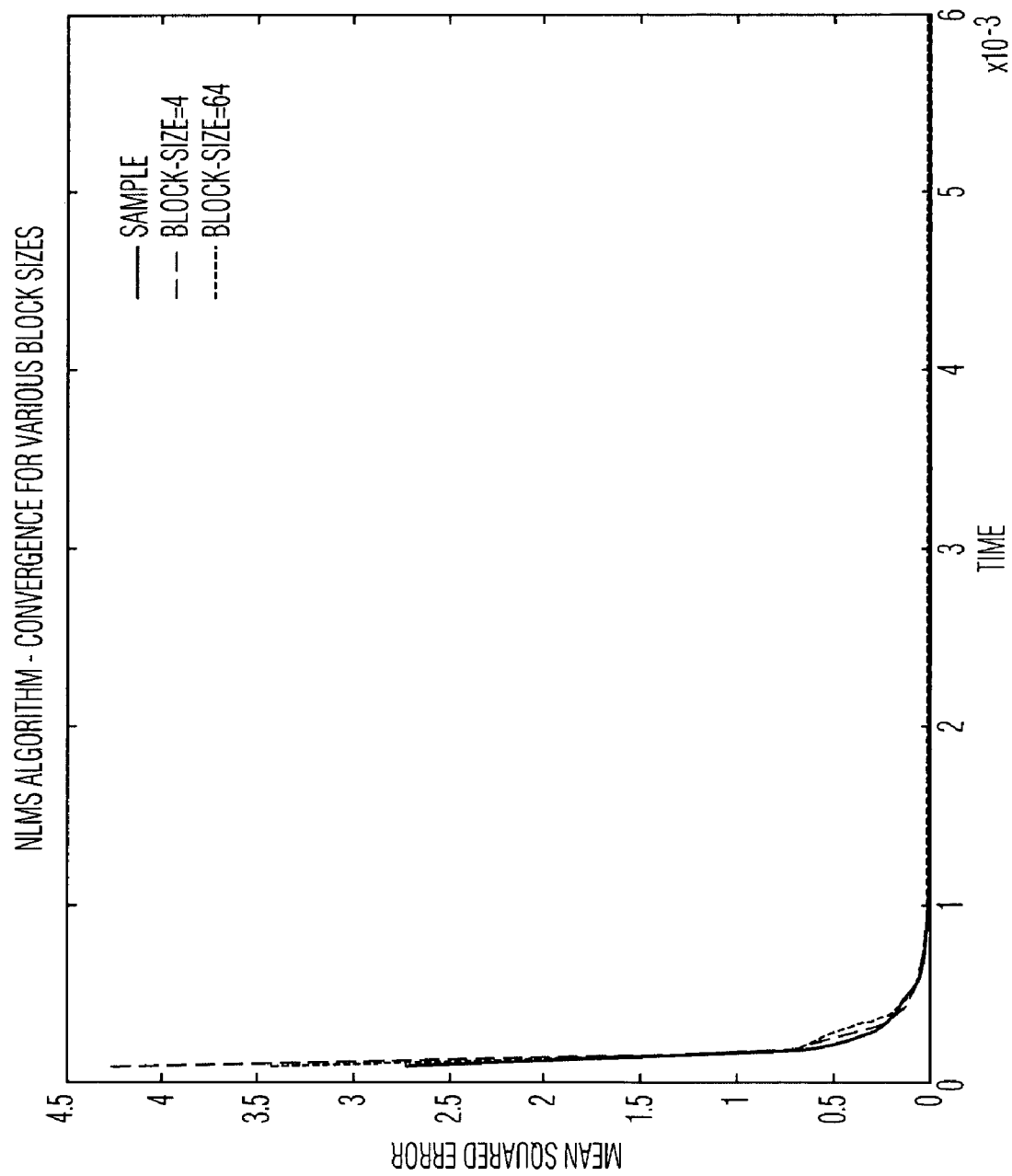

FIG. 9 illustrates error convergence for channel 1 using a forward filter length L=8, feedback filter length M=4, block sizes N=1, 4 and 64 samples, and a normalized least mean square (NLMS) error correction algorithm. The effect of blocking is once again negligible.

Figure 10:
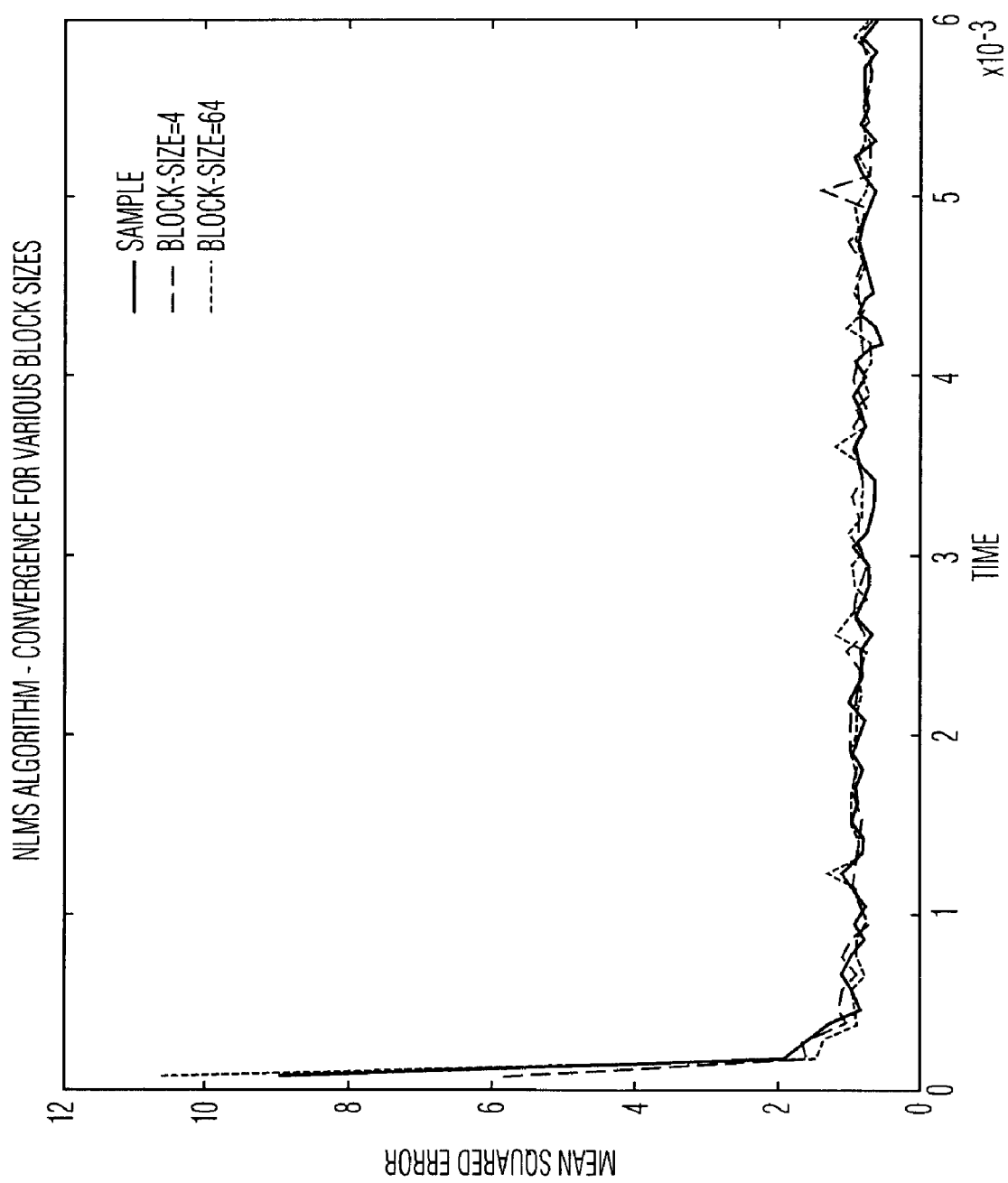

While the simulations of FIGS. 7 through 9 were performed with small filters and channels 1 or 2, the simulation was repeated for channel 3 and with longer filters. Once again, as seen in FIG. 10, there is no appreciable difference in performance between a sample-by-sample decision feedback equalizer and a block decision feedback equalizer. FIG. 10 illustrates normalized least mean square (NLMS) error convergence for larger forward and feedback filter lengths L=128 and M=256 and block sizes N=1, 4 and 64 samples.

The ability to perform block updates to a decision feedback equalizer without losing performance has significant architectural implications. The block decision feedback equalizer may be implemented using fast Fourier transforms because all involved structures, except the feedback filter, are FIR filters and convolution may be efficiently performed using FFTs. More significantly, block decision feedback equalizer structures enable efficient design of the FIR filter array for time domain implementation, providing the following advantages over the sample-by-sample update strategy:

Fast FIR filter algorithms can save up to 33% of computations over sample-by-sample update architectures.

The filtering and the update part have FIR structures and are independent of each other. Therefore, efficient use of both adaptive and fixed FIRs is possible. For example, either an N tap adaptive filter or a 2N tap fixed filter may be implemented with the same architecture. This may be useful in a multi-standard (e.g., VSB/QAM/COFDM) system where one standard has a number of fixed filters while the other has adaptive filters.

The block adaptive structures remain the same for different types of adaptive algorithms. If the error calculation is performed in software and the computationally intensive filtering and update portion is performed in hardware, the entire architecture becomes very flexible while keeping the costs low. Consequently, block adaptive decision feedback equalizer algorithms can improve the prospects of mapping the equalizer to a hardware-software partitioned architecture as required in a Software Defined Radio.

Block decision feedback equalizer structures enable efficient control by programmable (software) components, even when the FIR computation is performed in hardware. The interrupt or event rate to be handled by the software processor is decreased by the block size. If a programmable architecture (e.g., software radio) has both FFT and FIR processors, then the choice of one implementation over the other may be made based on filter lengths and availability of resources. The details for implementing both frequency domain (FD) equalizers and time domain (TD) equalizers for the ATSC-VSB reception may be compared, with the optimal architecture based on the channel estimate selected.

Block decision feedback equalizer structures may allow dynamic allocation of processor bandwidth by choosing whether to update the coefficients based on some metric derived from the error vector. Since the decision is made on a block, for software is run on a multi-tasking kernel the available bandwidth can be allocated to a lower priority task. However, this may be applicable only to lower rate processing where a software implementation is feasible, although such techniques may also find use in data modem applications such as digital subscriber line (DSL) modems.

Given the advantages detailed above, the block decision feedback equalizer structure may advantageously be mapped to an Adaptive Filter Array Processor (AFAP) for multi-standard channel decoding. Since the update is independent of the filtering, various hardware/software partitions may be feasible.

Although the present invention has been described in detail, those skilled in the art will understand that various changes, substitutions and alterations herein may be made without departing from the spirit and scope of the invention it its broadest form.

What is claimed is:

1. A block decision feedback equalizer for channel equalization comprising:
    a forward filter receiving and concurrently processing blocks containing input samples;
    a feedback filter receiving and concurrently processing blocks containing demapped equalized output samples; and
    a signal adder combining filtered input samples for a current block from the forward filter, filtered output samples for the current block from the feedback filter, and intra-block time varying output correction coefficients for the forward filter to produce equalized output samples for the current block.

2. The block decision feedback equalizer as set forth in claim 1 wherein the signal adder receives the intra-block time varying output correction coefficients for the forward filter and intra-block time varying output correction coefficients for the feedback filter for addition to the filtered input samples and the filtered output samples in producing the equalized samples.

3. The block decision feedback equalizer as set forth in claim 1 wherein the signal adder receives the intra-block time varying output correction coefficients for the forward filter and not intra-block time varying output correction coefficients for the feedback filter for addition to the filtered input samples and the filtered output samples in producing the equalized samples.

4. The block decision feedback equalizer as set forth in claim 3 wherein the signal adder receives the intra-block time varying output correction coefficients for the forward filter only when an error measurement for the current block exceeds a threshold.

5. The block decision feedback equalizer as set forth in claim 3 wherein filter coefficients utilized to produce the intra-block time varying output correction coefficients are computed at a rate lower than a rate at which input samples are received.

6. The block decision feedback equalizer as set forth in claim 1 further comprising:
    a forward error computation unit receiving the input samples to compute an inverse channel estimate and an error vector and producing an output correction vector for the forward filter; and
    a feedback error computation unit receiving the demapped equalized output samples to compute the inverse channel estimate and the error vector and producing an output correction vector for the feedback filter.

7. A receiver comprising:
    an input for receiving an input signal;
    a channel decoder for decoding the input signals; and
    a block decision feedback equalizer within the channel decoder for channel equalization comprising:
        a forward filter receiving and concurrently processing blocks containing input samples from the input signal;

a feedback filter receiving and concurrently processing blocks containing demapped equalized output samples; and a signal adder combining filtered input samples for a current block from the forward filter, filtered output samples for the current block from the feedback filter, and intra-block time varying output correction coefficients for the forward filter to produce equalized output samples for the current block.

8. The receiver as set forth in claim 7 wherein the signal adder receives the intra-block time varying output correction coefficients for the forward filter and intra-block time varying output correction coefficients for the feedback filter for addition to the filtered input samples and the filtered output samples in producing the equalized samples.

9. The receiver as set forth in claim 7 wherein the signal adder receives the intra-block time varying output correction coefficients for the forward filter and not intra-block time varying output correction coefficients for the feedback filter for addition to the filtered input samples and the filtered output samples in producing the equalized samples.

10. The receiver as set forth in claim 9 wherein the signal adder receives the intra-block time varying output correction coefficients for the forward filter only when an error measurement for the current block exceeds a threshold.

11. The receiver as set forth in claim 9 wherein filter coefficients utilized to produce the intra-block time varying output correction coefficients are computed for the forward filter at a rate lower than a rate at which input samples are received.

12. The receiver as set forth in claim 7 wherein the block decision feedback equalizer further comprises:

a forward error computation unit receiving the input samples to compute an inverse channel estimate and an error vector and producing an output correction vector for the forward filter; and a feedback error computation unit receiving the demapped equalized output samples to compute the inverse channel estimate and the error vector and producing an output correction vector for the feedback filter.

13. A method of block channel equalization comprising:

receiving and concurrently processing blocks containing input samples within a forward filter;

receiving and concurrently processing blocks containing demapped equalized output samples within a feedback filter; and combining filtered input samples for a current block from the forward filter, filtered output samples for the current block from the feedback filter, and intra-block time varying output correction coefficients for the forward filter within a signal adder to produce equalized output samples for the current block.

14. The method as set forth in claim 13 further comprising:

receiving the intra-block time varying output correction coefficients for the forward filter and intra-block time varying output correction coefficients for the feedback filter within the signal adder for addition to the filtered input samples and the filtered output samples in producing the equalized samples.

15. The method as set forth in claim 13 further comprising:

receiving the intra-block time varying output correction coefficients for the forward filter within the signal adder and not intra-block time varying output correction coefficients for the feedback filter for addition to the filtered input samples and the filtered output samples in producing the equalized samples.

16. The method as set forth in claim 15 wherein the step of receiving only intra-block time varying output correction coefficients for the forward filter within the signal adder and not intra-block time varying output correction coefficients for the feedback filter for addition to the filtered input samples and the filtered output samples in producing the equalized samples further comprises:

receiving the intra-block time varying output correction coefficients for the forward filter only when an error measurement for the current block exceeds a threshold.

17. The method as set forth in claim 15 wherein the step of receiving only intra-block time varying output correction coefficients for the forward filter within the signal adder and not intra-block time varying output correction coefficients for the feedback filter for addition to the filtered input samples and the filtered output samples in producing the equalized samples further comprises:

computing filter coefficients utilized to produce the intra-block time varying output correction coefficients for the forward filter at a rate lower than a rate at which the filtered input samples are received.

18. The block decision feedback equalizer as set forth in claim 1, wherein:

the forward filter receives and concurrently processes blocks containing a predetermined number of input samples; and the feedback filter receives and concurrently processes blocks containing the predetermined number of demapped equalized output samples.

19. The receiver as set forth in claim 7, wherein:

the forward filter receives and concurrently processes blocks containing a predetermined number of input samples; and the feedback filter receives and concurrently processes blocks containing the predetermined number of demapped equalized output samples.

20. The method as set forth in claim 13, wherein:

receiving and concurrently processing the blocks containing the input samples comprises receiving and concurrently processing blocks containing a predetermined number of input samples; and receiving and concurrently processing the blocks containing the demapped equalized output samples comprises receiving and concurrently processing blocks containing the predetermined number of demapped equalized output samples.

* * * * *